United States Patent [19]

Schmidt et al.

[11] Patent Number: 5,316,257

[45] Date of Patent: * May 31, 1994

[54] VEHICLE MOUNTING ASSEMBLY

[76] Inventors: William P. Schmidt, 21000 Woodruff, Rockwood, Mich. 48173; Franklin D. Hutchinson, 28000 Beel Rd., New Boston, Mich. 48164

[*] Notice: The portion of the term of this patent subsequent to Apr. 21, 2009 has been disclaimed.

[21] Appl. No.: 870,522

[22] Filed: Apr. 17, 1992

Related U.S. Application Data

[63] Continuation of Ser. No. 419,213, Oct. 10, 1989, Pat. No. 5,106,049.

[51] Int. Cl.$^5$ .............................................. B60R 1/00
[52] U.S. Cl. .................................... 248/487; 296/152
[58] Field of Search ................. 248/487, 476, 475.1, 248/74.3, 231, 316.5, 534, 539, 540, 541; 24/543, 487; 296/152; 350/606, 631, 632, 634

[56] References Cited

U.S. PATENT DOCUMENTS

| | | | |
|---|---|---|---|
| 1,905,623 | 4/1933 | Deitz | 248/487 |
| 3,667,718 | 6/1972 | Goslin et al. | 248/487 |
| 3,729,163 | 4/1973 | Cummins | 248/487 |
| 3,778,016 | 12/1973 | Geenhardt et al. | 248/475 |
| 3,833,198 | 9/1974 | Holzman | 248/476 |
| 3,857,539 | 12/1974 | Kavanaugh | 248/475 |
| 3,906,592 | 9/1975 | Sakasegawa et al. | 248/73 |
| 3,976,275 | 8/1976 | Clark | 248/487 |
| 4,030,692 | 6/1977 | Szilagyi | 248/487 |
| 4,368,868 | 1/1983 | Urban | 248/549 |
| 4,500,063 | 2/1985 | Schmidt et al. | 248/475.1 |
| 4,609,171 | 9/1986 | Matsui | 248/74.3 |
| 4,830,326 | 5/1989 | Schmidt et al. | 248/479 |
| 5,005,963 | 4/1991 | Schmidt et al. | 350/631 X |
| 5,106,049 | 4/1992 | Schmidt et al. | 248/487 |

Primary Examiner—David L. Talbott
Attorney, Agent, or Firm—Weintraub, DuRoss & Brady

[57] ABSTRACT

The mounting assembly readily enables longitudinal or transverse adjustment of the position of the mirror relative to the vehicle. The mounting assembly includes a mirror shaft, a base member and a cover member to secure the upper end of the mirror shaft to the back of the mirror; a pair of anchors and sleeves which anchor the medial portion of the mirror shaft to the vehicle, and a clamping member and a bracket member to mount the lower end of the mirror shaft to the vehicle. The mirror shaft is secured within the clamping member, the clamping member is mounted onto the bracket member, and the bracket member is mounted onto the vehicle. The base member is secured to the back of the mirror, and the upper end of the mirror shaft is securely retained between the cover member and the base member. Two elongated anchors are cooperatively engaged with two sleeves which are medially disposed abut the mirror shaft. One end of each anchor is securely affixable to the vehicle, and the second end of each anchor is securely affixable to the sleeve which surround the mirror shaft.

16 Claims, 4 Drawing Sheets

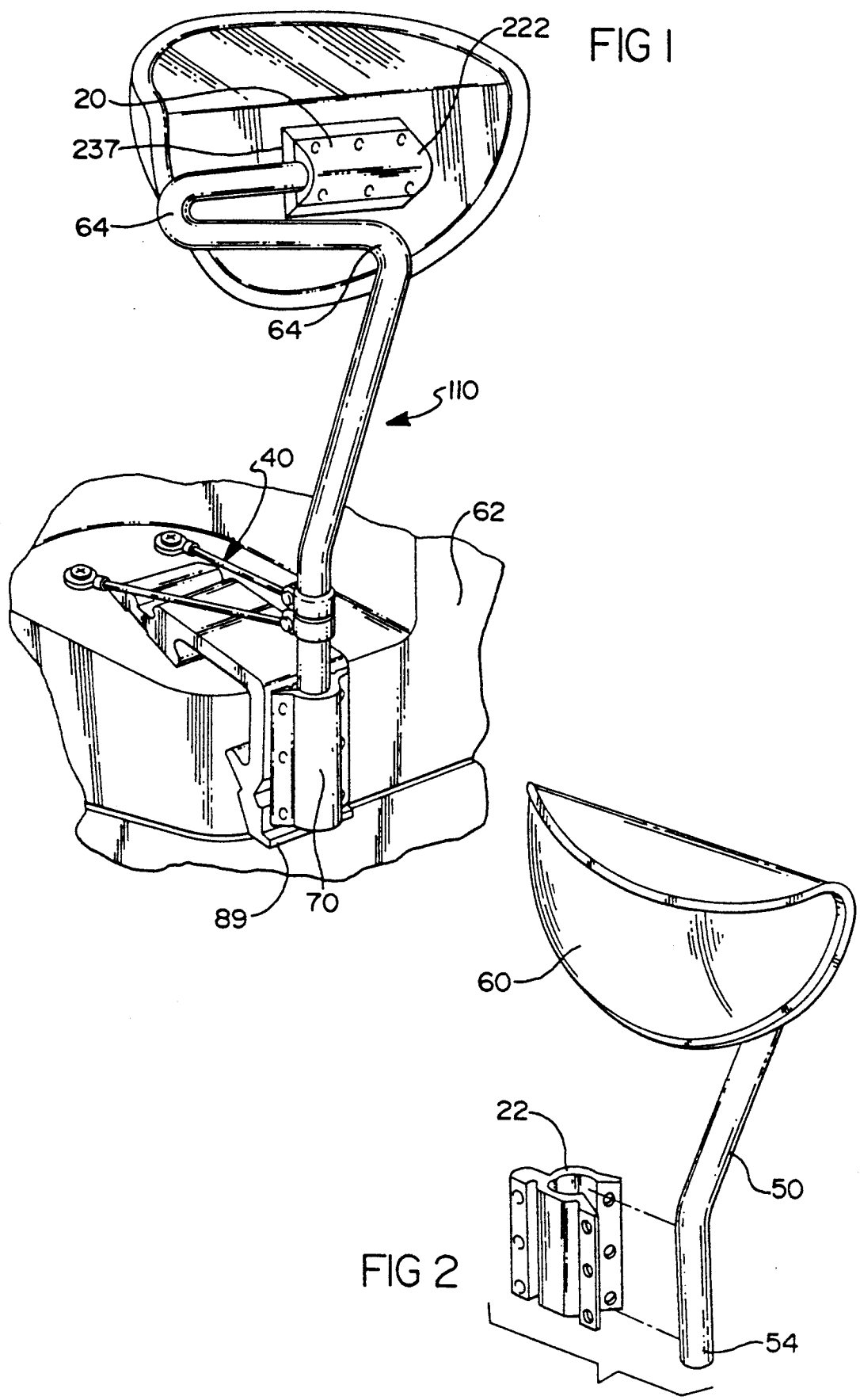

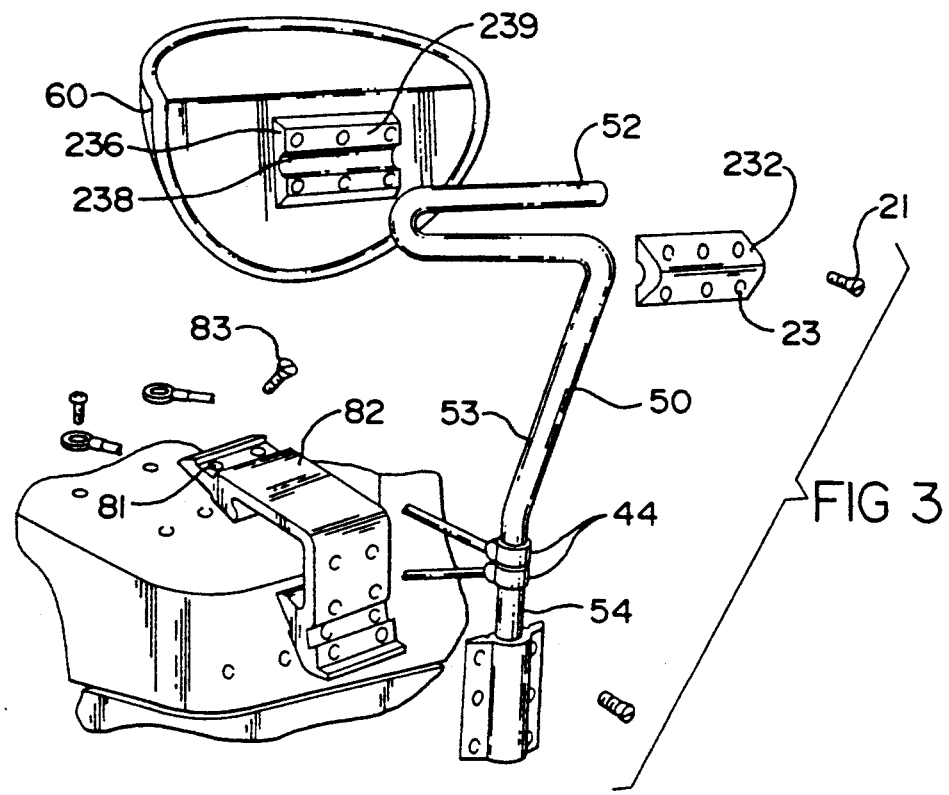
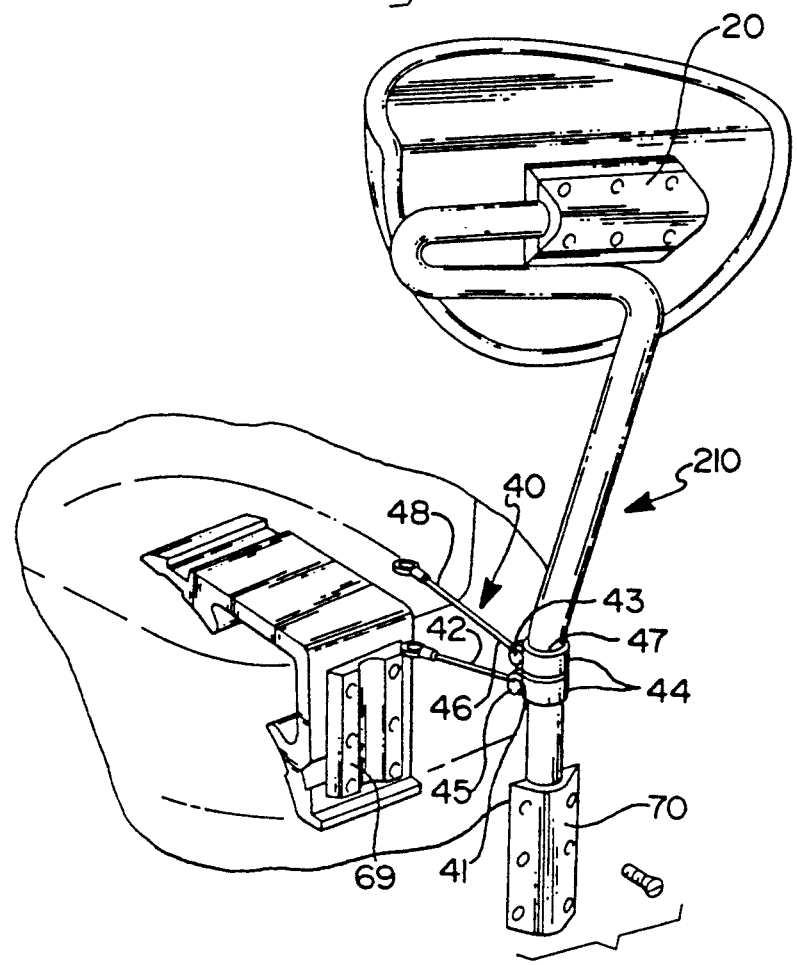

VEHICLE MOUNTING ASSEMBLY

This is a continuation of the U.S. application Ser. No. 07/419,213, filed Oct. 10, 1989 now U.S. Pat. No. 5,106,049.

FIELD OF THE INVENTION

The present invention relates to a vehicle mounting assembly to be used for securing mirrors to motor vehicles, and more particularly, to large trucks and buses.

BACKGROUND OF THE INVENTION

A rear view mirror must enhance the field-of-view of the driver about the vehicle. However, chronic mirror vibration can make even the best reflective surface ineffective. Since it is generally preferred that the mirror extend above the front of the vehicle so that the driver can (1) view objects in front of the vehicle, and (2) easily locate the mirror, the mirror mounting assembly is generally elongated, and the likelihood of chronic mirror vibration is enhanced. Numerous mirror mounting supports are known for securing the mirror to the vehicle.

U.S. Pat. No. 1,932,873 discloses a support for a rearview mirror positioned on the side of a truck which can be laterally and vertically adjusted to the desired position, which is capable of firmly holding the mirror in the adjusted angular position. U.S. Pat. No. 3,395,883 discloses a detachable fender mounted rear view mirror having a tripodal frame and a Y-shaped clamp designed to minimize mirror vibration. The mirror assembly involves no fasteners to enable a rapid mounting. U.S. Pat. No. 4,500,063 discloses a fender mount for a rear view mirror attachable to the curved portion of the vehicle fender. The fender mount includes a base member attached to the fender and a cover member which secures the lower portion of the tubular shaft to the base member.

A mirror mounting assembly must not only enabled ready adjustment of the orientation of the mirror to accommodate drivers of varying sizes, but also securely affix the mirror to the vehicle to minimize mirror vibration. While traveling at high speeds, the driver is highly dependent upon the rear view mirrors to locate objects approaching the vehicle from both sides and the rear. If the mirror mounting assembly does not securely affix the mirror to the vehicle allowing unnecessary mirror vibration, the utility of the mirror is diminished, and public safety is compromised.

What is needed is a mirror mounting assembly for larger vehicles which readily enables longitudinal or transverse adjustment of the position of the mirror relative to the vehicle, and minimizes vibration of the mirror relative to the vehicle.

SUMMARY OF THE INVENTION

The mounting assembly of the present invention preferably includes a mirror shaft, an upper clamping member to secure the upper end of the mirror shaft to the back of the mirror, a pair of anchors and sleeves which anchor the medial portion of the mirror shaft to the vehicle, a lower clamping member, and a bracket member to mount the lower clamping member to the vehicle.

The lower clamping member has an elongated bore disposed therethrough which the lower end of the mirror shaft may be securely retained. The lower clamping member preferably has a "living hinge" which enables the lower clamping member to pivot about the mirror shaft in a jaw-like manner. When the lower clamping member is in the open position, the mirror shaft may be inserted or removed therefrom, and when the clamping member is in the closed position the mirror shaft is securely retained therein.

In the preferred embodiment, the lower clamping member includes a latch having a male member and a female member. The male member of the latch is disposed on the cover portion of the clamping member, and the female member of the latch is disposed on the base portion of the clamping member. The top of the mirror shaft is securely retained between a longitudinal bore disposed within an upper clamping member, the upper clamping member being similar to the lower clamping member.

The bracket member is generally L-shaped. A first strut is disposed on one surface of the bracket member and a second strut is disposed on another surface of the bracket member. The mirror shaft is inserted and secured within the clamping member. The clamping member is mounted onto the bracket member, and the two struts are secured to the vehicle.

The two elongated anchors are cooperatively engaged with two sleeves which are medially disposed about the mirror shaft. One end of each anchor is securely affixable to the vehicle, and the second end of each anchor is securely affixable to the sleeves which encase the medial portion of the mirror shaft.

For a more complete understanding of the vehicle mounting assembly of the present invention, reference is made to the following detailed description and accompanying drawings in which the presently preferred embodiments of the invention are illustrated by way of example. As the invention may be embodied in several forms without departing from the spirit or essential characteristics thereof, it is expressly understood that the drawings are for purposes of illustration and description only, and are not intended as a definition of the limits of the invention. Throughout the following description and drawings, identical reference numbers refer to the same component throughout the several views.

BRIEF DESCRIPTION OF THE DRAWINGS

FIG. 1 is a perspective view of a first alternate embodiment of the mounting assembly of the present invention, depicting a base member and a cover member which secure the upper end of the mirror shaft to the back of the mirror, a pair of anchors medial to the mirror shaft, and a clamping member and a bracket member which secure the lower end of the mirror shaft to the vehicle;

FIG. 2 depicts an assembly view of the mounting assembly depicted in FIG. 1;

FIG. 3 depicts the clamping member of FIG. 1 in an open position relative to the mirror shaft;

FIG. 4 is a perspective view of a second alternate embodiment of the mounting assembly of the present invention, depicting a base member and a cover member which secure the upper end of the mirror shaft to the back of the mirror, a pair of anchors medial to the mirror shaft, and a base member and a cover member which secure the lower end of the mirror shaft to the vehicle;

DETAILED DESCRIPTION OF THE PREFERRED EMBODIMENTS

Figure 9:
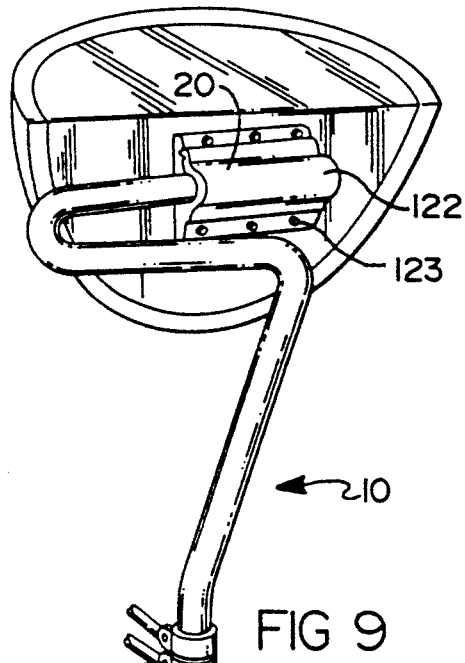
FIG. 9 is a perspective view of the preferred embodiment of the mounting assembly of the present invention, depicting the clamping member as shown in FIG. 8 securing the upper end of the mirror shaft to the back of the mirror, and another clamping member as shown in FIG. 8 securing lower end of the mirror shaft to the vehicle.

Referring now to the drawings, FIG. 9 depicts the preferred embodiment of the mounting assembly 10 of the present invention. The mounting assembly 10 preferably includes a mirror shaft 50, a first clamping means 20 for securing the upper portion 52 of the mirror shaft 50 to the back of the mirror 60, means 40 for anchoring the medial portion 53 of the mirror shaft 50 to the vehicle 62, and a second clamping means 70 for mounting the lower portion 54 of the mirror shaft 50 to the the vehicle 62.

Figure 7:
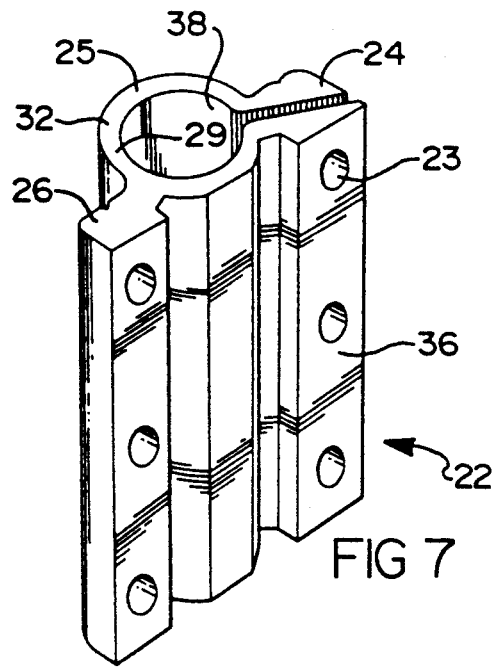
FIG. 7 depicts a perspective view of the preferred embodiment of the clamping member shown in FIG. 1.

The first clamping means 20 and the second clamping means 70 may be either (a) the clamping member 22 depicted in FIG. 7; (b) the clamping member 122 depicted in FIG. 8; or (c) a variation of the clamping member 122 disclosed in U.S. Pat. No. 4,500,063 entitled "Fender Mount for a Mirror", as hereinafter described.

Figure 8:
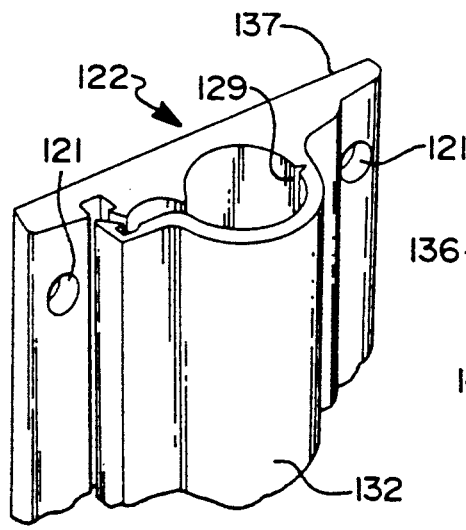
FIG. 8 depicts a perspective view of the preferred embodiment of a clamping member, wherein the cover portion is latched to the base portion of the clamping member.

The clamping member 22 of FIG. 7 has an open position (see FIG. 2) and a closed position. The clamping members of FIG. 7 and FIG. 8 are made either of a plastic material, such as polypropylene, aluminum, or of a high grade steel. The clamping member 22 has a first end portion 24 and a second end portion 26 and a center portion 25. In the closed position the end portions 24 and 26 are generally flat and the center portion 25 has a generally cylindrical shape.

The cover portion 32 of the clamping member 22 includes substantially one-half of the center portion 25 and substantially one-half of the first end portion 24. The base portion 36 of the clamping member 22 includes the other half of the center portion 25, the other half of the first end portion 24, and all of the second end portion 26.

The clamping member 22 has an open position and a closed position. In the closed position the end portions 24 and 26 are generally flat and the center portion 25 has a generally cylindrical shape. The longitudinal bore 38 disposed through the center portion 25 securely retains the upper end 52 of the mirror shaft. A plurality of apertures 23 are disposed in the first end portion 24 and in the second end portion 26 for cooperatively engaging with a plurality of fasteners 21 for mounting the clamping member 22 onto the back of the mirror 60, or to the bracket member 82. The clamping member 22 has a "living hinge" 29 which enables the clamping member 22 to pivotally open in a jaw-like manner, as the upper end 52 of the mirror shaft is engaged and disengaged therefrom. The longitudinal bore 38 disposed through the center portion 25 enables the mirror shaft 50 to be securely retained.

Alternatively, and as noted herein, the clamping member 22 may be used to mount the mirror shaft 50 onto the bracket member 82. The cover portion 32 of the clamping member 22 is rotatably disposed relative to the base portion 36 of the clamping member 22, enabling the mirror shaft 50 to be engaged and disengaged relative to the clamping member 22. The cover portion 32 is preferably disposed relative to the base portion 36 such that when the fasteners 21 are disengaged from only the aligned first end portion 24, the clamping member 22 is locked in the closed position and secured to the bracket member 82. However, when the fasteners 21 are removed from only the aligned first end portion 24, the cover portion 32 may open or close while the base portion 36 is secured to the bracket member 82.

The clamping means 20 and 70 may also be the clamping member 122 depicted in FIG. 8. The clamping member 122 has a cover portion 132 and a base portion 136, and the mounting surface of the base portion 136 is essentially flat. The clamping member 122 has an elongated bore disposed therethrough. The clamping member 122 has a "living hinge" 129, which enables the clamping member 122 to open and close as required. The clamping member 122 pivotally opens in a jaw-like manner enabling the mirror shaft 50 to be engaged and disengaged therefrom. The clamping member 122 has a latch 141. The male member 143 of the latch is preferably disposed on the cover portion 132 of the clamping member 136, and the female member 145 of the latch is preferably disposed on the base portion 136 of the clamping member 122.

The clamping means 20 and 70 may also comprise a variation of the clamping member disclosed in U.S. Pat. No. 4,500,063 entitled "Fender Mount for a Mirror" by W. P. Schmidt and F. D. Hutchinson, the disclosure of which is incorporated herein by reference. As shown in FIGS. 1 and 3 the clamping member 222 includes a base portion 236 and a cover portion 232 secured to the upper portion 52 of the mirror shaft, or to the mounting bracket 82. The base portion 236 has a mounting surface 237 and an opposed outer surface 239. The cover portion 232 is secured to the outer surface 239 of the base portion 236.

The base portion 236 and the cover portion 232 together define a longitudinal bore 238 for securing the top end 52 of the mirror shaft therebetween. A plurality of apertures 23 are disposed in the base portion 236 and the cover portion 232 for cooperatively engaging with a plurality of threaded fasteners 21 for mounting the cover portion 232 onto the base portion 236, and the base portion 236 onto the back of the mirror 60. The cover portion 232 is adjustable relative to the base portion 236 to enable a repositioning of the mirror shaft 50 therebetween.

When the clamping means 20 or 70 is secured to a flat surface, (the bracket member 82 or the back of the mirror 60) a base portion 236 having a flattened mounting surface 237 is used (instead of the curved mounting surface as disclosed in U.S. Pat. No. 4,500,063). The clamping means 222 is preferably used to attach the mirror 60 to the mirror shaft 50. When the securing means 20 is used for attachment to a curved portion of the body of the vehicle 62, the mounting surface 237 of the base portion 236 has a general curvature which matches the curved portion of the vehicle 62.

The bracket member 82 (as shown in FIGS. 1 and 3 through 6) enables the second clamping means 70 to be mounted to the vehicle 62. The bracket member 82 is generally L-shaped. The bracket member 82 has two faces 84 and 86 which are generally normal to each other. The clamping means 70 is mountable onto the first face 84 of the bracket member, the first face 84 being preferably aligned in a vertical orientation. The bracket member 82 has a first strut 85 extending from the first face 84 and a second strut 87 extending from the second face 86. The first strut 85 and the second strut 87 each have a series of apertures 81 disposed therein, which enable a series of fasteners 83 to be inserted therethrough for secure attachment to the vehicle 62. The mirror shaft 50 is secured within the clamping means 70, and the clamping means 70 is mountable onto the bracket member 82.

The first strut 85 of the bracket member is affixable to a first part of the vehicle 62, and the second strut 87 of the bracket member preferably is affixable to a second part of the vehicle 62. The first face 84 of the bracket member 82 preferably has a flange extension 89 which is generally normal to the first face 84. The mirror shaft 50 is restable upon the flange extension 89.

Figure 5:
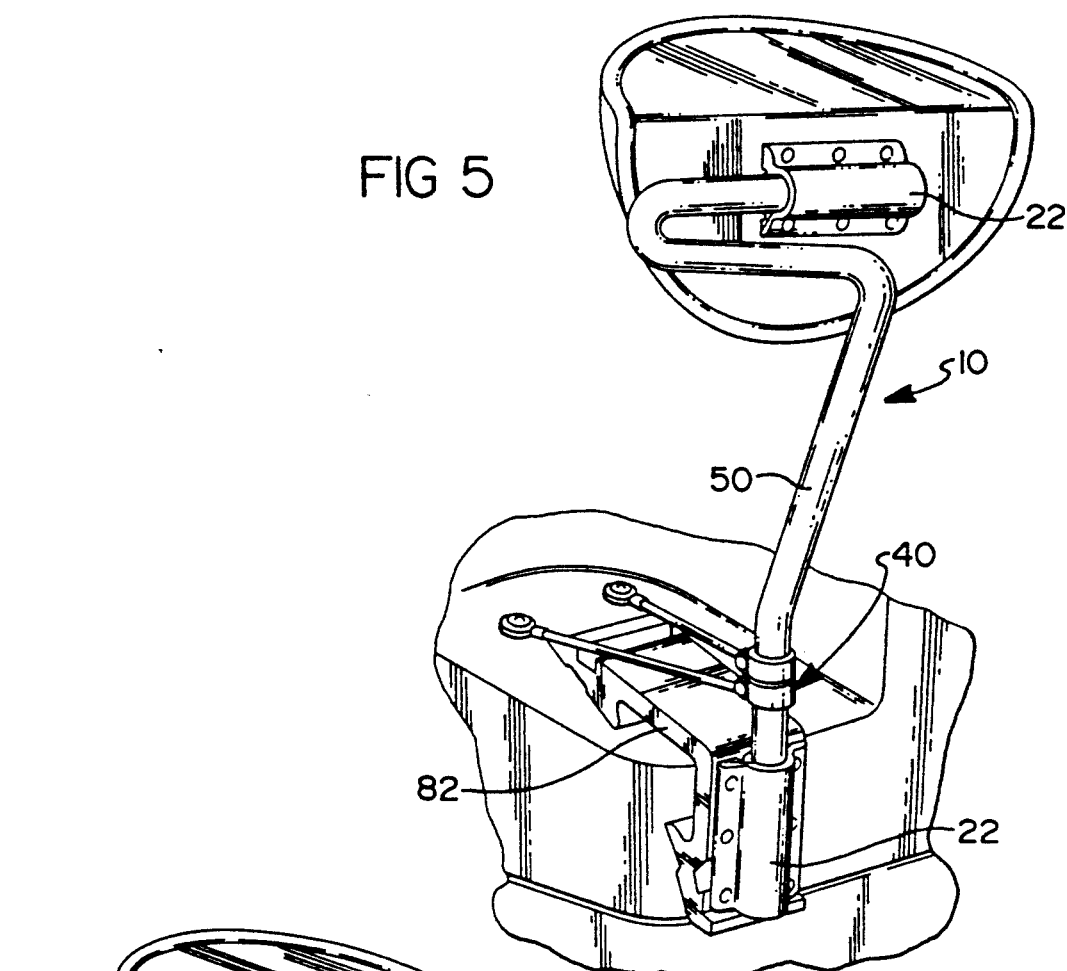
FIG. 5 is a perspective view of a third alternate embodiment of the mounting assembly of the present invention, depicting a clamping member which secures the upper end of the mirror shaft to the back of the mirror, a pair of anchors medial to the mirror shaft, and a clamping member and a mounting bracket which secures the lower end of the mirror shaft to the vehicle.

The top portion of the mirror shaft is attached to the back of the mirror 60 (see for example FIG. 5). The mirror shaft 50 has a plurality of radical bends 64 therein, each of which is equal to or greater than a ninety degree arc. Proceeding away from the mirror 60, the mirror shaft 50 extends along a substantially horizontal plane and undergoes a double radical bend 64 (U-shaped), while still being substantially horizontal until the mirror shaft 50 crosses the proximate center of the mirror 60. The mirror shaft 50 then undergoes another radical bend 64 and thereafter is slanted inward and downward toward the vehicle 62 as the mirror shaft 50 approaches the second clamping means 70.

The center of gravity of the mirror 60 and the mounting assembly 10 preferably are disposed within the mirror shaft 50, which minimized the vibration of the mirror 60. The mirror 60 is positioned slightly to one side of the mirror shaft 50 to compensate for the U-shaped portion of the mirror shaft 50, which is disposed on the opposite side of the mirror 60. Also, in some instances, it may be necessary to secure weights (not shown) onto the mounting assembly 10 to properly position the center of gravity within the mirror shaft 50.

The anchoring means 40 (see FIG. 1) cooperates with the balanced center of gravity of the mirror 60 and the mounting assembly 10 to further eliminate vibration of the mirror 60. The anchoring means 40 preferably includes two elongated anchors 42, each of which are cooperatively engaged with a cylindrical sleeve 44, which is disposed about the medial portion 53 of the mirror shaft 50. The upper end 46 of each elongated anchor 42 is securely affixable to the mirror shaft 50, and the lower ends 48 of the two elongated anchors 42 are securely affixable to two separate parts of the vehicle 62.

Each of the two sleeves 44 have a tubular bore 47 through which the mirror shaft 50 is inserted. Both sleeves 44 have an extension 45, through which a sleeve aperture 41 is disposed. A fastener 43 is insertable through each sleeve aperture 41 to retain each sleeve 44 in a closed position about the mirror shaft 50. The upper end 46 of the first anchor is securely affixable to the first sleeve fastener 43, and the upper end 46 of the second anchor is securely affixable to the second sleeve fastener 43.

Although it is preferred that the mounting assembly 10 includes anchoring means 40 with two anchors 42 and two cooperating sleeves 44 for purposes of ballast, the mounting assembly 10 may contain any number of anchors 42 and sleeves 44 and the mounting assembly 10 may also be used without any such anchoring means 40.

In a first alternate embodiment as shown in FIGS. 1 and 2, the mounting assembly 110 is similar to the mounting assembly 10 of the preferred embodiment (FIG. 9), except that the clamping means 70 which secures the lower end 54 of the mirror shaft to the vehicle 62 is the clamping member 22 depicted in FIG. 7, and the clamping means 20 which secures the upper end 52 of the mirror shaft 50 to the back of the mirror 60 is the clamping member disclosed in U.S. Pat. No. 4,500,063 (see FIG. 2).

In a second alternate embodiment as shown in FIG. 4, the mounting assembly 210 is similar to the mounting assembly 10 of the preferred embodiment, except that the clamping means 70 which secures the lower end 54 of the mirror shaft to the vehicle 62 is the clamping member disclosed in U.S. Pat. No. 4,500,063 (see FIG. 2), and the clamping means 20 which secures the upper end 52 of the mirror shaft 50 to the back of the mirror 60 is also the clamping member disclosed in U.S. Pat. No. 4,500,063 (see FIG. 2). Also note that at least one of the faces has a seat 69 to cooperate with the clamping means 70.

A first cover member 32 is secured to a first base member 22 which is secured to the back of the mirror 60; and a second cover member 32 is secured to the second base member 22 which is mounted to the bracket member 82. The mounting surface of the base member is secured to the bracket member 82, which provides additional ballast to the mounting assembly 110. The cover member 132 is secured to the outer surface 126 of the base member. A longitudinal bore 130 is formed between the base member 122 and the cover member 132, through which the lower end 54 of the mirror shaft 50 is retained. A plurality of apertures 121 are disposed in the base member 122 and the cover member 122 for cooperatively engaged with a plurality of fasteners 123 for mounting the cover member 132 onto the base member 122 and the base member 122 onto the bracket member 82. The cover portion 132 is adjustable relative to the base member 122 to enable a repositioning of the lower end 54 of the mirror shaft therebetween.

Figure 6:
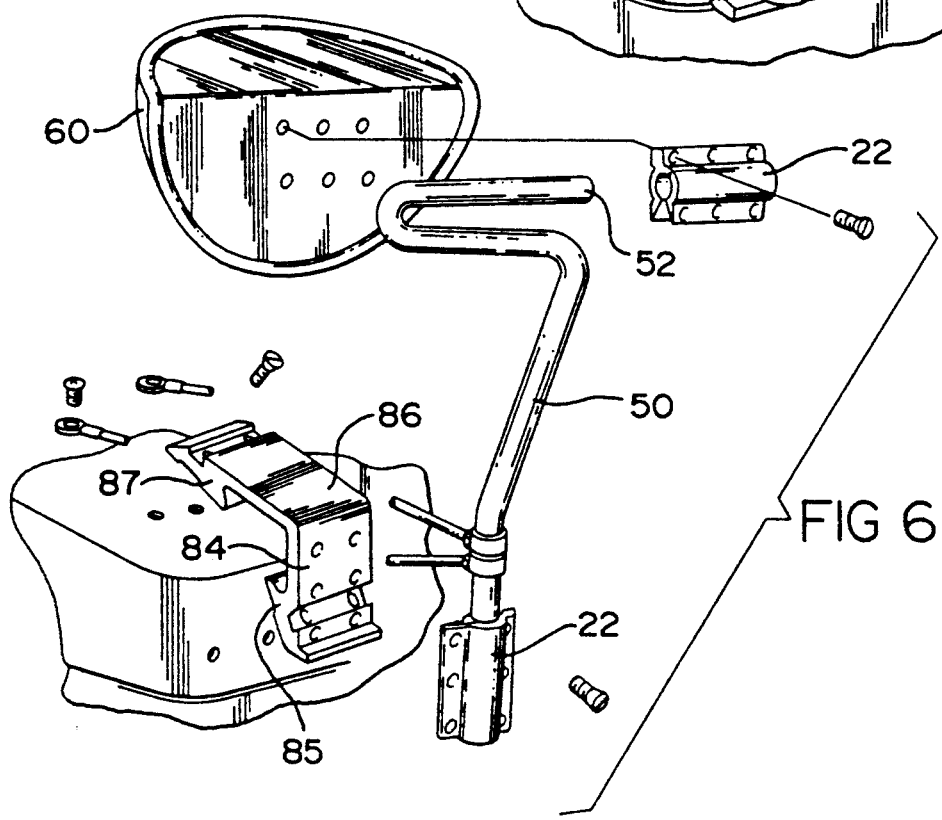
FIG. 6 depicts an assembly view of the mounting assembly depicted in FIG. 5.

In a third alternate embodiment as shown in FIGS. 5 and 6, the clamping means 20 and 70 are both the clamping members 22 depicted in FIG. 7. In this embodiment, one clamping member 22 is secured to the bracket member 82, and a second clamping member 22 is secured to the back of the mirror 60.

Figure 10:
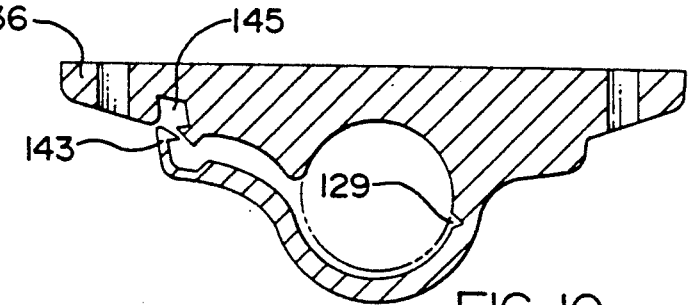
FIG. 10 depicts an end view of the clamping member of FIG. 8, the cover portion being shown as unlatched from the base portion.
Figure 11:
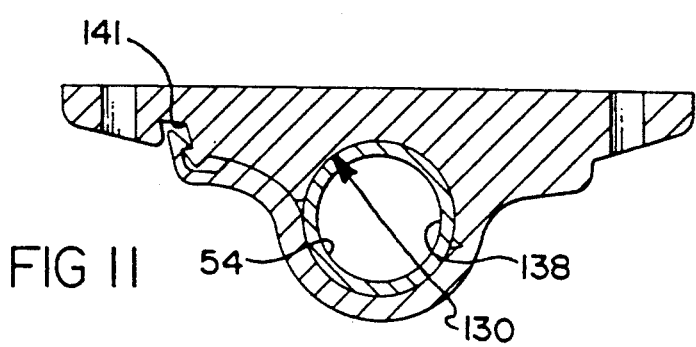
FIG. 11 depicts an end view of the clamping member of FIG. 8, the cover portion being shown as latched to the base portion, with the mirror shaft being disposed therein.

FIG. 9 depicts the preferred embodiment of the mounting assembly 10 of the present invention, wherein the clamping member 122 of FIG. 8 securely retains the upper elongated section 52 of the mirror shaft 50 to the rear of the mirror 60, and the clamping member 122 of FIG. 8 securely retains the lower elongated section 54 of the mirror shaft 50 to the bracket member 82. FIG. 10 depicts an end view of the clamping member 122 of FIG. 8, the cover portion 132 being shown as unlatched from the base portion 136. FIG. 11 depicts an end view of the clamping member 122 of FIG. 8, the cover portion 132 being shown as latched to the base portion 136, with the mirror shaft 50 being disposed therein.

While the vehicle mounting assembly 10 has been described in conjunction with specific embodiments, it is evident that many alternatives, modifications, and variations will be apparent to those skilled in the art in light of the disclosure herein. It is intended that the metes and bounds of the invention be determined by the appended claims rather than by the language of the above specification, and that all such alternatives, modifications, and variations which form a function or conjointly cooperative equivalent are intended to be included within the spirit and scope of these claims.

We claim:

1. A bracket assembly for mounting a mirror shaft to a vehicle, the bracket assembly comprising:
   (a) a base portion, the base portion being removably mountable to a portion of a surface of a vehicle body, the base portion having a first face and a second face angularly extending from the first face, the first face having a first strut provided thereon and the second face having a second strut provided thereon, the faces cooperating to define an essentially curved mounting with the first and second struts complementary to the surface of the vehicle body, at least one of the faces having a seat for a mirror shaft;
   (b) a cover portion for covering the seat of the base, the cover portion being attachable to the base portion, the cover portion having a bearing surface and an outer surface, the cover portion and the base portion being cooperable to securely clamp a mirror shaft therebetween; and
   (c) means for attaching the cover portion to the base portion.

2. The bracket assembly of claim 1, wherein the base portion has a mounting surface and an opposed outer surface.

3. The bracket assembly of claim 2, wherein the means for attaching the cover portion to the base portion is at least one fastener.

4. The bracket assembly of claim 3, wherein the cover portion is attachable to the outer surface of the base portion.

5. The bracket assembly of claim 3 wherein the outer surface of the base portion has a longitudinal partial bore formed therein for seating a mirror shaft.

6. The bracket assembly of claim 4, wherein the bearing surface of the cover portion has a partial longitudinal bore formed therein for clamping a mirror shaft; and wherein the base portion and the cover portion cooperate to securely clamp a mirror shaft therebetween.

7. The bracket assembly of claim 1 wherein the base portion has at least one aperture formed therein for receiving a fastener therethrough to mount the bracket assembly to the vehicle to define the means for attaching.

8. The bracket assembly of claim 1 wherein the base portion is adhesively attachable to the vehicle.

9. A mirror mounting assembly for mounting a mirror assembly to a vehicle, the mirror mounting assembly comprising;
   (a) mirror shaft having a first end and a second end the mirror shaft having a plurality of radical bends, and a center of gravity, the center of gravity being disposed with the mirror shaft;
   (b) first means for clamping the first end of the mirror shaft to the mirror assembly;
   (c) second means for clamping the second end of the mirror shaft to a vehicle, the second means for clamping comprising:
      (1) a base portion, the base portion being removably mountable to a portion of a surface of a vehicle body, the base portion having a first face and a second face angularly extending from the first face, the first face having a first strut provided thereon and the second face having a second strut provided thereon, the face cooperating to define an essentially curved mounting with the first and second struts complementary to the surface of the vehicle body, at least one of the faces having a seat for a mirror shaft seat; and
      (2) a cover portion for covering the seat of the base portion being attachable to the base portion, the cover portion having a bearing surface and an outer surface, the cover portion and the base portion being cooperable to securely clamp the mirror shaft therebetween; and
   (c) means for attaching the cover portion to the base portion.

10. The mirror assembly of claim 9, wherein the base portion has a mounting surface and an opposed outer surface.

11. The mirror mounting assembly of claim 9, wherein the means for attaching the cover portion to the base portion is at least one fastener.

12. The mirror mounting assembly of claim 9, wherein the base portion has at least one aperture formed therein for receiving a fastener therethrough to mount the mirror assembly to the vehicle.

13. The mirror mounting assembly of claim 9, wherein the base portion is adhesibly attachable to the vehicle.

14. The mirror mounting assembly of claim 10, wherein the cover portion is attachable to the outer surface of the base portion.

15. The mirror mounting assembly of claim 9, wherein the base portion has a longitudinal partial bore formed therein for seating the mirror shaft.

16. The mirror mounting assembly of claim 15, wherein the cover portion has a longitudinal partial bore formed therein for clamping the mirror shaft; and wherein the base portion and the cover portion cooperate to securely clamp the mirror shaft.

* * * * *